(12) United States Patent
Vitel

(10) Patent No.: US 6,240,300 B1
(45) Date of Patent: May 29, 2001

(54) TELEPHONY DEVICE COMPRISING A BASE STATION AND AT LEAST A SUBSCRIBER UNIT AND METHOD FOR CONNECTING TO SUCH A TELEPHONY DEVICE

(75) Inventor: Sandrine Vitel, Le Mans (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/047,684

(22) Filed: Mar. 25, 1998

(30) Foreign Application Priority Data

Apr. 2, 1997 (FR) .................................................. 97 03998

(51) Int. Cl.[7] ...................................................... H04Q 7/20
(52) U.S. Cl. ........................... 455/550; 455/426; 455/507; 455/517; 455/561
(58) Field of Search ..................................... 455/426, 502, 455/462, 412, 560, 561, 507, 517, 550

(56) References Cited

U.S. PATENT DOCUMENTS

| | | | |
|---|---|---|---|
| 5,077,790 | 12/1991 | D'Amico et al. ........................ | 380/23 |
| 5,212,684 | * 5/1993 | MacNamee et al. .................. | 370/280 |
| 5,794,152 | * 8/1998 | Hikuma et al. ...................... | 455/502 |
| 5,873,033 | * 2/1999 | Hjern et al. ............................ | 455/417 |
| 5,930,712 | * 7/1999 | Byrne et al. .......................... | 455/437 |
| 5,978,664 | * 11/1999 | Janssen ............................... | 455/226.2 |
| 5,983,100 | * 11/1999 | Johansson et al. ................... | 455/426 |
| 5,995,842 | * 11/1999 | Jonsson ................................ | 455/462 |

OTHER PUBLICATIONS

European Telecommunication Standard, Working Draft PR ETS 300 175–5, Jan. 1995, Second Edition, Radio Equipment and Systems (RES); Digital European Cordless Telecommunications (DECT) Common Interface Part 5: Network Layer.

Frank Owen, "The Complete Solution For Cordless Access", Philips Telecommunications Review, vol. 52, No. 3, pp. 19–22.

* cited by examiner

Primary Examiner—Lee Nguyen
Assistant Examiner—Simon Nguyen
(74) Attorney, Agent, or Firm—Jack D. Slobod

(57) ABSTRACT

A telephony device includes a base station (BS) connected to a switched network, at least a subscriber unit (HS1, HS2, . . . ) and at least a connecting element (30). The telephony device also includes a management assembly (20) formed by a processor assembly (29), by a memory (26) containing an execution program and by a random access memory (24) for containing, inter alia, program elements to be executed with respect to the management of the links between the switched network, the base station, at least one of the subscriber units and at least one of the connecting elements. Each of the links is ensured by half-calls assigned to the calling and call circuits and by links between these two half-calls.

6 Claims, 3 Drawing Sheets

TELEPHONY DEVICE COMPRISING A BASE STATION AND AT LEAST A SUBSCRIBER UNIT AND METHOD FOR CONNECTING TO SUCH A TELEPHONY DEVICE

DESCRIPTION

Field of the Invention

The invention relates to a telephony device including a base station connected to the switched network, one or more subscriber units, the telephony device comprising a management assembly formed by a processor assembly, by a memory containing an execution program and by a random-access memory for containing, inter alia, program elements to be executed with respect to the management of the links between the switched network, the base station, and at least one of the subscriber units and at least one of the connection elements. The invention likewise relates to a method implemented in such a telephony device, for connecting to such a telephony device.

Background of the Invention

The invention finds interesting applications in telecommunication systems implying protocols, which is notably the case with telephony devices satisfying the DECT standard, for example.

In telephony devices of this type, the maintenance problems of the programs that direct the operation of such devices become ever more critical because of the fact that they are to be able to adjust themselves to various requirements. Thus, for example these problems occur when from a telephony device that has already been arranged for ensuring the connection between the subscriber unit and the network, one wishes also to ensure a link with a new connection element, for example, a telephone answering machine.

This type of problem is also found back in systems of the GSM type, or those which connect to the ISDN lines.

SUMMARY OF THE INVENTION

The present invention proposes a telephony device of the type defined in the opening paragraph which permits of facilitating the maintenance of this device so that it may adapt itself to links with new connection elements without having to modify too profoundly all the programs directing the operation.

Therefore, such a telephony device is characterized in that each of the links is ensured by half-calls assigned to the calling circuit and called circuit and by links between these half-calls.

The idea of the invention consists of defining with these half-calls the elements that are connected. By analyzing these half-calls, it is thus simple to know what is suitable for these elements, which signal it is to send, etc.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
FIG. 1 shows a telephony device according to the invention.
Figure 1:
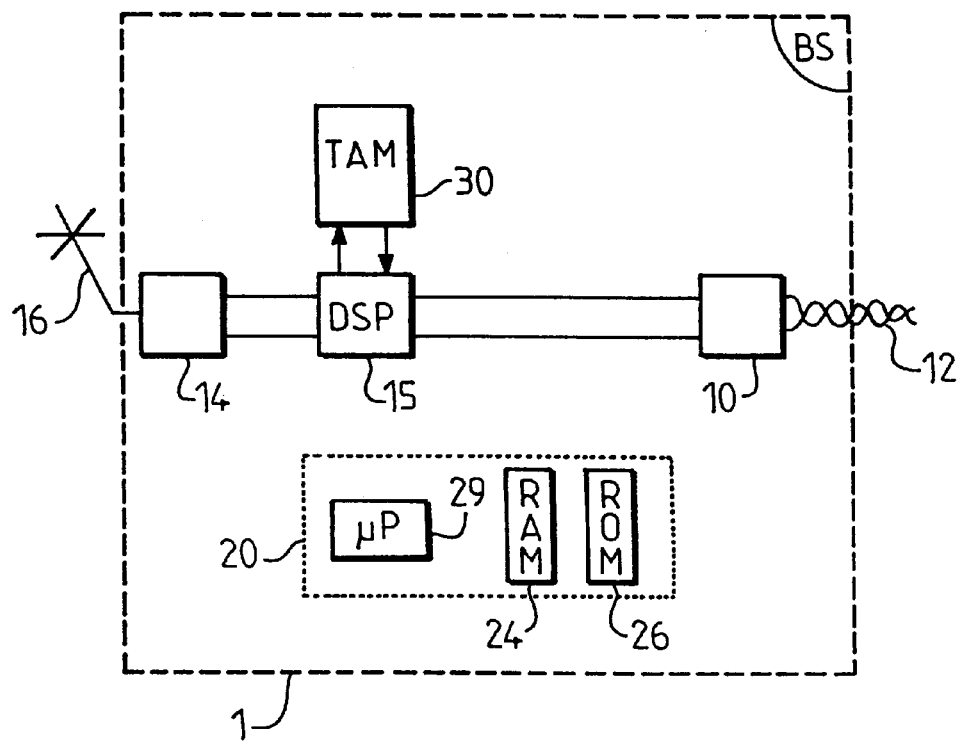

In FIG. 1, the telephony device which is represented is a device satisfying the DECT standards. In the standard ETSI ETS 300 175-5 part 5: "Layer Network", one will find various data relating to this type of telephony device. Reference 1 shows the basic circuit BS to which may be connected a plurality of handsets or subscriber units HS1, HS2, . . . by radio channel. This basic circuit 1 comprises, inter alia, a line circuit 10 which permits the basic circuit to be connected to the switched network over a telephone line 12 and a radio circuit 14 which authorizes the dialogue with the various handsets HS1, HS2, . . . by emitting and receiving waves via an antenna 16. For processing all the data of the analog type which are conveyed inside the basic circuit, a signal processing element 15 is provided formed around a signal processor DSP which processes notably speech signals. All the elements of this basic circuit are managed by a microprocessor assembly 20. This element 15 is formed notably in the usual manner by a random access memory 24, a read only memory 26 containing the operating instructions of the device and a management processor 29. This telephony device also includes a telephone answering machine 30 formed, in essence, by a flash memory. This memory is thus intended to contain all the messages necessary for the answering machine function.

According to the invention, for establishing a link between elements of the telephony device, that is to say, either a connection between the handsets or a connection between one of the handsets and telephone line 12, or also connections taken part in by the telephone answering machine formed, in essence, by the memory 30, half-calls are established.

Figure 2:
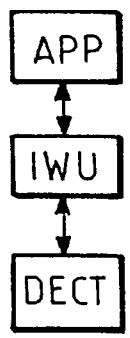
FIG. 2 shows protocol layers defined by the DECT standard.

These half-calls are managed at the level of the IWU (Inter Working Unit) layer shown in FIG. 2. This IWU layer is situated on the interface of the DECT protocol as defined by the aforesaid standard and of the application APP which is to be defined by the manufacturer.

Figure 3:
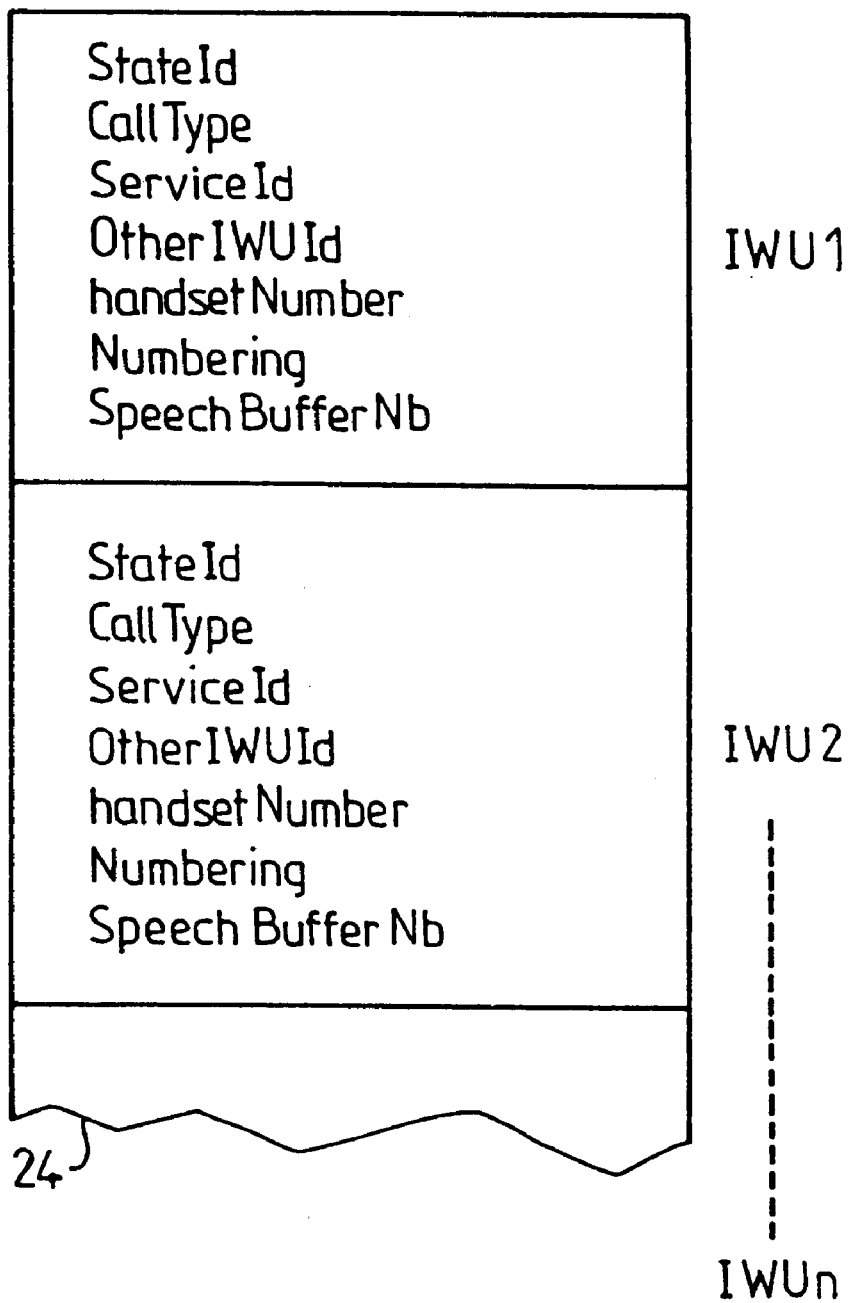
FIG. 3 shows the implementation of the half-calls.

Each time a connection is desired, according to the invention half-call objects are created. FIG. 3 shows the structure of these half-calls, those referenced IWU1, IWU2, . . . , IWUn. These half-calls are a set of variable memories which are implanted in the memory 24 depending on the need.

These variables are named as defined in the following Table 1 which gives the meaning of these variables:

TABLE 1

| | |
|---|---|
| StateId: | gives the state in which the half-call is: for example, standby, connected, switch connection etc. . . . |
| CallType: | nature of the call and direction of the call. |
| ServiceId: | nature of the connection: network, base station, telephone answering machine, etc. |
| OtherWUId: | identifies the other IWU object to which the IWU is connected. |
| HandsetNumber: | identifies the handset that has caused the creation of the object. |
| Numbering: | number formed by the handset on the basis of which a number is dialled. |
| SpeechBufferNb: | capacity of the buffer memory to be assigned for the processing of the speech signals. |

For each part concerned by a call, this Table is filled.

Figure 4:
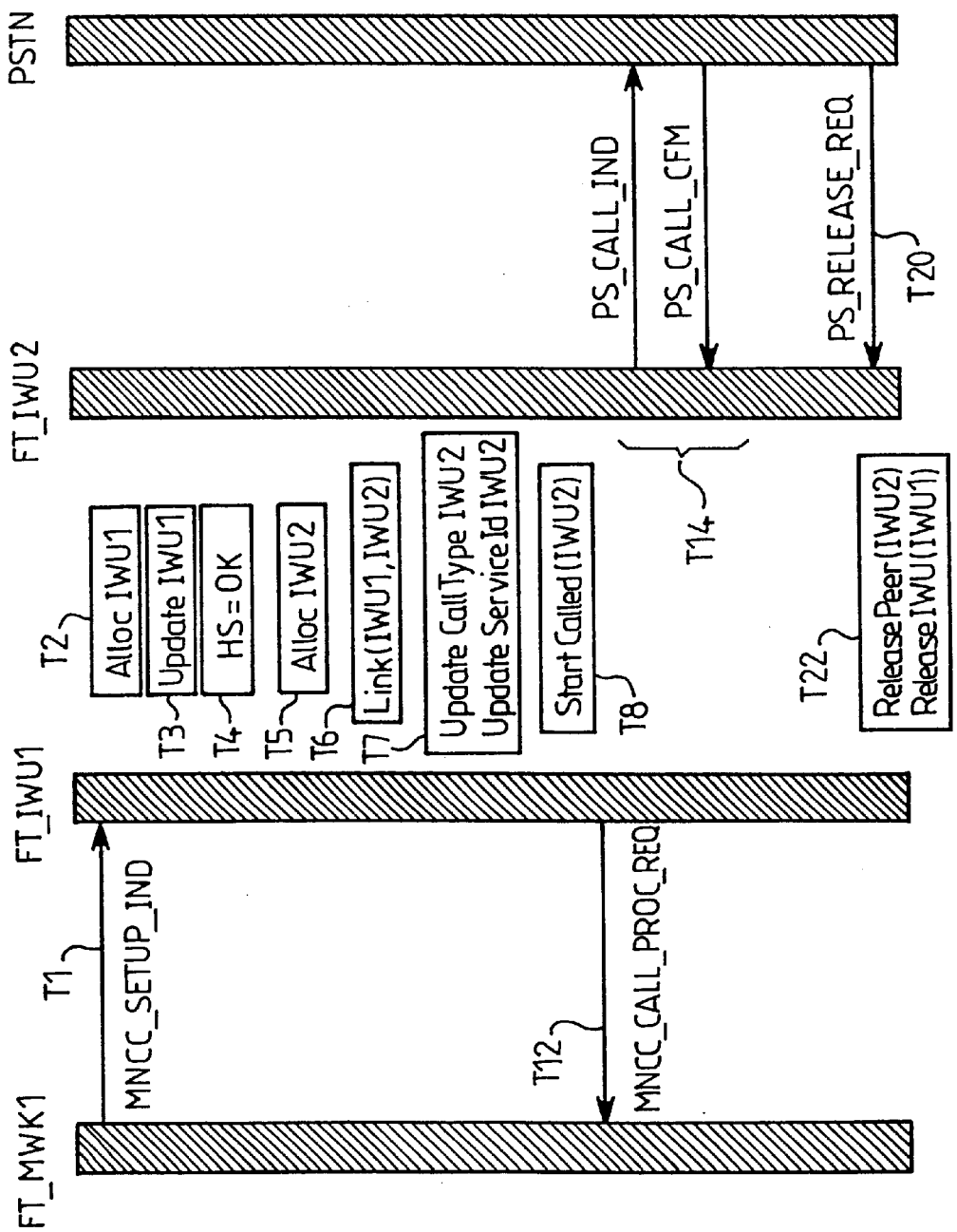
FIG. 4 shows in the form of a diagram the establishment and release according to the invention of a communication of an element which forms part of the telephony device shown in FIG. 1.

FIG. 4 explains an example where the measures of the invention are implemented. This example relates to a call coming from a handset (calling circuit) which wishes to be connected to the telephone network (called circuit). In this FIG. 4, various vertical hatched bars are referenced FT_MWK1, FT_IWU1, FT_IWU2 and PSTN assigned respectively to the layers DECT, IWU, IWU and APP (compare FIG. 2).

The operation will be explained for the case where a call for the network is asked for by a handset. This call is translated by the appearance of the signal MNCC_SETUP_IND defined in the DECT standard mentioned above and indicated in FIG. 4 by a first task referenced T1. According to the invention, an object IWU1 is created by the function ALLOC IWU1 (referenced T2) and another task T3 will be to carry it out with the available elements. This is effected by the function Update. Various elements of the Table IWU1 are thus carried out. Then, a test is made (task T4) whether the handset is suitable for calling; it is admitted that the handset is authorized. Then another object is created which is named IWU2 (task T5). Then the numbers of the link between these two objects will be formed by means of the function Link(IWU1, IWU2) which is indicated in task T6. By this function Link( ), the field OtherIWUId of each of the objects IWU1 and IWU2 is complemented by the identifiers of either one. Thus, this field will contain IWU2 for the object IWU1 and IWU1 for the object IWU2. The Table IWU2 is updated by updating the headings CallType and ServiceId. This is shown by the task T7. Then the call is released (task T8). This is then signaled to the calling handset by the signal MNCC_CALL_PROC_REQ (task T12). The link to the network task T14 is finally established by means of signals PS_CALL_IND and its release response PS_CALL_CFM. The link may be interrupted from the network which causes the appearance of the signal PS_RELEASE_REQ (task T20). This accordingly releases the objects IWU1 and IWU2 (task T22).

The analysis of these Tables IWUi makes it possible to analyze all the connections which are taking place and to know their status. Thus, this makes a simple management of the links possible.

What is claimed is:

1. A telephony device comprising a base station connected to a switched network, one or more subscriber units capable of wireless communication with the base station in accordance with a predetermined standard, and at least one connection element, the telephony device comprising a management assembly formed by a processor, a memory containing an execution program and a random-access memory for containing program elements to be executed by the processor with respect to the management of calls which may be set up between a calling circuit and a called circuit, said called circuit being one and said calling circuit being another of the switched network, the base station, the subscriber units, and the at least one connection element, wherein said program elements are configured such that a call between a calling circuit and a called circuit is set up by creating objects, referred to as half-calls, assigned to the calling circuit and called circuit, respectively, and forming links between these half-calls, and further wherein the half-calls are represented by respective tables implemented in said memory, each table for a half-call being formed by variables which define at least the state and type of the half-call and identify at least another half-call to which it is linked.

2. The telephony device as claimed in claim 1, wherein the predetermined standard is the DECT standard, and the half-calls are implemented in the IWU (InterWorking Unit) layer defined by said standard.

3. A telephony device as claimed in claim 2, wherein the at least one connection element has a telephone answering machine function.

4. A telephony device as claimed in claim 1, wherein the at least one connection element has a telephone answering machine function.

5. A method carried out by a management assembly of a base station connected to a switched network for setting up calls between a called circuit and a calling circuit, said called circuit being one and said calling circuit being another of the base station, one or more subscriber units capable of wireless communication with the base station, and at least one connection element, said method comprising creating objects, referred to as half-calls, assigned to the calling circuit and called circuit, respectively, and forming links between these half-calls, wherein the half-calls are represented by respective tables implemented in a memory of said management assembly, each table for a half-call being formed by variables which define at least the state and type of the half-call and identify at least another half-call to which it is linked.

6. A method as claimed in claim 5, wherein the at least one connection element has a telephone answering machine function.

* * * * *